(12) United States Patent
Kim et al.

(10) Patent No.: US 8,533,145 B2
(45) Date of Patent: Sep. 10, 2013

(54) UBIQUITOUS MONITORING SYSTEM CAPABLE OF PERFORMING INTEGRAL MONITORING FOR SMART OBJECTS

(75) Inventors: Jai Hoon Kim, Seongnam-si (KR); Sung Hwa Lim, Bucheon-si (KR); Byoung Hoon Lee, Suwon-si (KR); Dong Wook Lee, Suwon-si (KR); We Duke Cho, Seongnam-si (KR)

(73) Assignee: Ajou Univeristy Industry Cooperation Foundation, Gyeonggi-do (KR)

( * ) Notice: Subject to any disclaimer, the term of this patent is extended or adjusted under 35 U.S.C. 154(b) by 358 days.

(21) Appl. No.: 13/058,225

(22) PCT Filed: Sep. 18, 2008

(86) PCT No.: PCT/KR2008/005547
§ 371 (c)(1),
(2), (4) Date: Feb. 9, 2011

(87) PCT Pub. No.: WO2010/024490
PCT Pub. Date: Mar. 4, 2010

(65) Prior Publication Data
US 2011/0137846 A1     Jun. 9, 2011

(30) Foreign Application Priority Data
Aug. 25, 2008 (KR) ............. 10-2008-0082801

(51) Int. Cl.
*G06N 5/02* (2006.01)
(52) U.S. Cl.
USPC ............................ 706/50; 702/187
(58) Field of Classification Search
None
See application file for complete search history.

(56) References Cited

U.S. PATENT DOCUMENTS

| 5,892,690 | A | 4/1999 | Boatman et al. ......... 364/528.11 |
| 7,139,834 | B1* | 11/2006 | Albanese et al. ............. 709/238 |
| 2006/0282498 | A1* | 12/2006 | Muro ............................ 709/203 |
| 2007/0103298 | A1* | 5/2007 | Kim et al. ................. 340/539.22 |
| 2007/0236346 | A1* | 10/2007 | Helal et al. ............... 340/539.22 |
| 2008/0160938 | A1* | 7/2008 | Hwang et al. ................. 455/132 |
| 2009/0059842 | A1* | 3/2009 | Maltseff et al. ............... 370/328 |
| 2009/0157587 | A1* | 6/2009 | Lim et al. ........................ 706/47 |
| 2009/0261978 | A1* | 10/2009 | Lee et al. ................... 340/573.1 |

FOREIGN PATENT DOCUMENTS
KR   10-0793057   1/2008

OTHER PUBLICATIONS

Lee H. et al., "Monitoring System in Ubiquitous Smart Space", Pervasive 2008 Workshop Proceedings, May 2008, pp. 261-264.*
Helal S. et al., "The Gator Tech Smart House: A Programmable Pervasive Space", Computer, IEEE Computer Society, Mar. 2005, pp. 50-60.*

(Continued)

*Primary Examiner* — Jeffrey Gaffin
*Assistant Examiner* — Dave Misir
(74) *Attorney, Agent, or Firm* — Harness, Dickey & Pierce, P.L.C.; Anthony G. Fussner; Kisuk Lee

(57) ABSTRACT

There is provided a ubiquitous monitoring system comprising a plurality of sensing nodes; one or more monitoring agents receiving and transmitting sensing data of the sensing nodes; a monitoring module receiving the sensing data from the one or more monitoring agents and managing the sensing data for each type and time; an analysis module deducing one of function information, performance information, and status information for each of smart objects in a ubiquitous space, based on the sensing data, deducing one of function information, performance information, and status information of a ubiquitous service performed by coupled smart objects, and transmitting a result of deduction; and a monitoring viewer displaying the result of deduction to a user.

5 Claims, 3 Drawing Sheets

(56) References Cited

OTHER PUBLICATIONS

Ma J. et al., "Towards a Smart World and Ubiquitous Intelligence: A Walkthrough from Smart Things to Smart Hyperspaces and UbicKids", J. Pervasive Comput. & Comm. 1 (1), Mar. 2005, pp. 53-68.*

Yamazaki T. "Beyond the Smart Home", 2006 International Conference on Hybrid Information Technology.*

International Search Report and Written Opinion in PCT/KR2008/005547 dated Apr. 13, 2009.

Kwon, et al. (2008) "An Efficient Monitoring Method for Ubiquitous System Platform Based on Autonomic Community Computing." *Journal of Information Science: Computing Practices and Letters* 14(1):86-90 (English Abstract included).

Kwon, et al. (2008) "Real-time Monitoring Agent for Ubiquitous System." *The Korean Society of Computer and Information* 35(1)(A):231-232.

Kwon, et al. (2008) "Real-time Monitoring Agent for Ubiquitous System." *Journal of Information Science: Computing Practices and Letters* 14(8):753-826 (English Abstract Only).

Martinez, et al. (2004) "Environmental Sensor Networks." *Computer* 37(8):50-56.

Steigner, et al. (2002) "Multi-Source Performance Analysis of Distributed Software." *The Communication Networks and Distributed Systems Modeling and Simulation Conference* 2002, pp. 1-16.

* cited by examiner

UBIQUITOUS MONITORING SYSTEM CAPABLE OF PERFORMING INTEGRAL MONITORING FOR SMART OBJECTS

CROSS-REFERENCE TO RELATED APPLICATIONS

This application is a national phase application of PCT Application No. PCT/KR2008/005547 filed on Sep. 18, 2008, which claims the benefit and priority to Korean Patent Application No. 10-2008-0082801 filed Aug. 25, 2008. The entire disclosures of the applications identified in this paragraph are incorporated herein by references.

TECHNICAL FIELD

The present invention relates to a ubiquitous monitoring system, and more particularly, to a ubiquitous monitoring system capable of integrally monitoring various smart objects in a ubiquitous space.

BACKGROUND ART

General ubiquitous monitoring systems provide only a function of monitoring individual devices or software objects. Also, general ubiquitous monitoring systems provide only a function of analyzing individual devices or software objects.

DETAILED DESCRIPTION OF THE INVENTION

Technical Problem

The present invention provides a ubiquitous monitoring system capable of integrally monitoring various smart objects in a ubiquitous space.

Technical Solution

According to an aspect of the present invention, there is provided a ubiquitous monitoring system including: a plurality of sensing nodes; one or more monitoring agents receiving and transmitting sensing data of the sensing nodes; a monitoring module receiving the sensing data from the one or more monitoring agents and managing the sensing data for each type and time; an analysis module deducing one of function information, performance information, and status information for each of smart objects, based on the sensing data, deducing one of function information, performance information, and status information of a ubiquitous service performed by coupled smart objects, and transmitting a result of deduction; and a monitoring viewer displaying the result of deduction to a user.

The sensing data are layered as first level information, information for each of the smart objects is layered as second level information, and information on the ubiquitous service is layered as third level information.

Advantageous Effects

A ubiquitous monitoring system according to an embodiment of the present invention may integrally monitor various smart objects in a ubiquitous space.

BEST MODE FOR CARRYING OUT THE INVENTION

Figure 1:
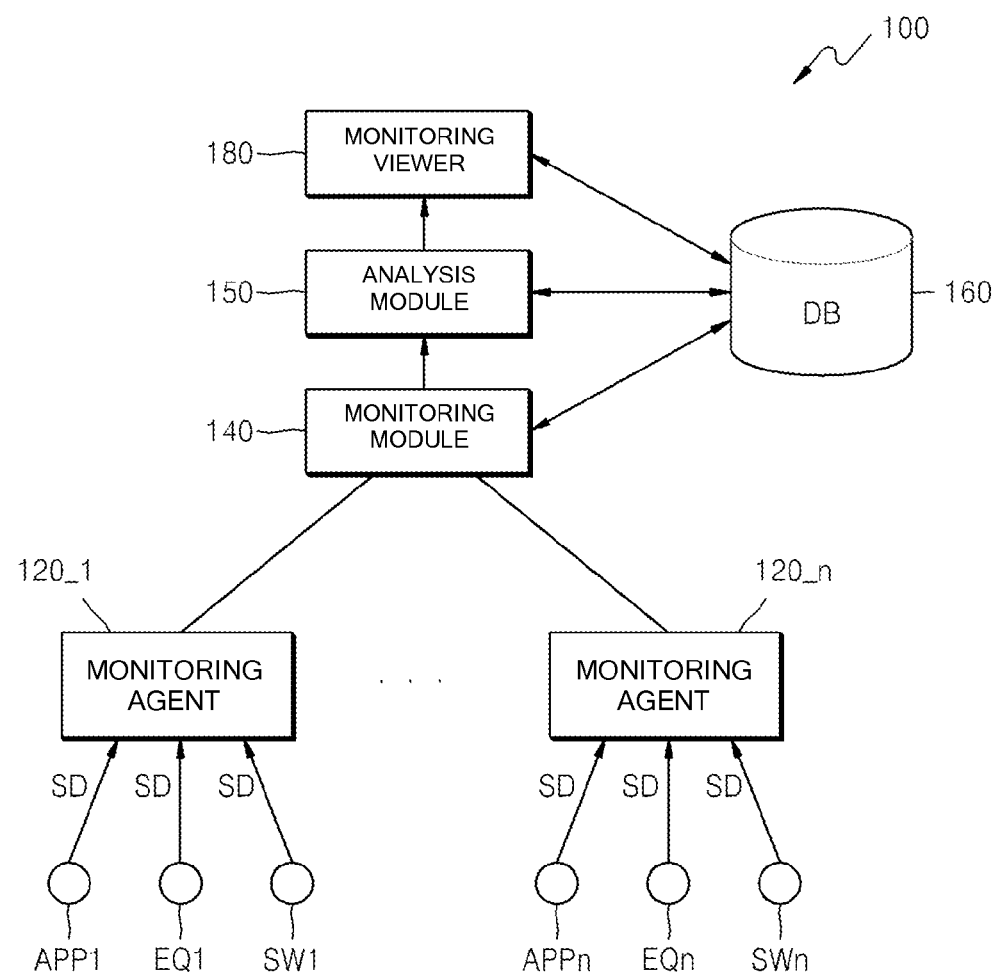
FIG. 1 is a block diagram illustrating a ubiquitous monitoring system according to an embodiment of the present invention.

To fully understand advantages of operations of the present invention and the objects obtained by embodiments of the present invention, it is required to refer to attached drawings illustrating preferable embodiments of the present invention and contents shown in the drawings. Hereinafter, the preferable embodiments of the present invention will be described in detail with reference to the attached drawings. The same reference numerals shown in each drawing indicate the same elements.

FIG. 1 is a block diagram illustrating a ubiquitous monitoring system 100 according to an embodiment of the present invention.

Referring to FIG. 1, the system 100 includes a plurality of sensing nodes APP1 to APPn, EQ1 to EQn, and SW1 to SWn, one or more monitoring agents 120_1 to 120_n, a monitoring module 140, an analysis module 150, a database 160, and a monitoring viewer 180.

The plurality of sensing nodes APP1 to APPn, EQ1 to EQn, and SW1 to SWn are installed in a ubiquitous space, sense various data generated in the ubiquitous space, and transmit sensing data to the monitoring agents 120_1 to 120_n.

For example, the sensing nodes APP1 to APPn may be various applications executed in the ubiquitous space, the sensing nodes EQ1 to EQn may be various devices belonging to the ubiquitous space, and the sensing nodes SW1 to SWn may be various software executed in the ubiquitous space. The sensing nodes APP1 to APPn, EQ1 to EQn, and SW1 to SWn may sense and transmit hardware data such as a rate of using a CPU, a status of using a memory, and a residual amount of a battery, to the monitoring agents 120_1 to 120_n. Also, the sensing nodes APP1 to APPn, EQ1 to EQn, and SW1 to SWn may sense and transmit software data such as thread information, a message transmission status, and a status of procedure, to the monitoring agents 120_1 to 120_n.

The one or more monitoring agents 120_1 to 120_n receive and transmit sensing data of the sensing nodes APP1 to APPn, EQ1 to EQn, and SW1 to SWn, to the monitoring module 140.

The monitoring module 140 collects sensing data from the one or more monitoring agents 120_1 to 120_n and manages the sensing data for each type and time. The monitoring module 140 may modify formats of the collected sensing data into a data format capable of being recognized by the analysis module 150.

The analysis module 150 deduces function information, performance information, and status information for each of smart objects, based on sensing data. The analysis module 150 deduces function information, performance information, and status information on a ubiquitous service executed by coupled smart objects, based on the information for each of the smart objects. The analysis module 150 transmits a result of deduction to the monitoring viewer 180.

The monitoring viewer 180 displays the result of deduction to a user.

The monitoring module 140, the analysis module 150, and the monitoring viewer 180 may store operation logs, collected sensing data, and a result of deduction in the database 160.

Figure 2:
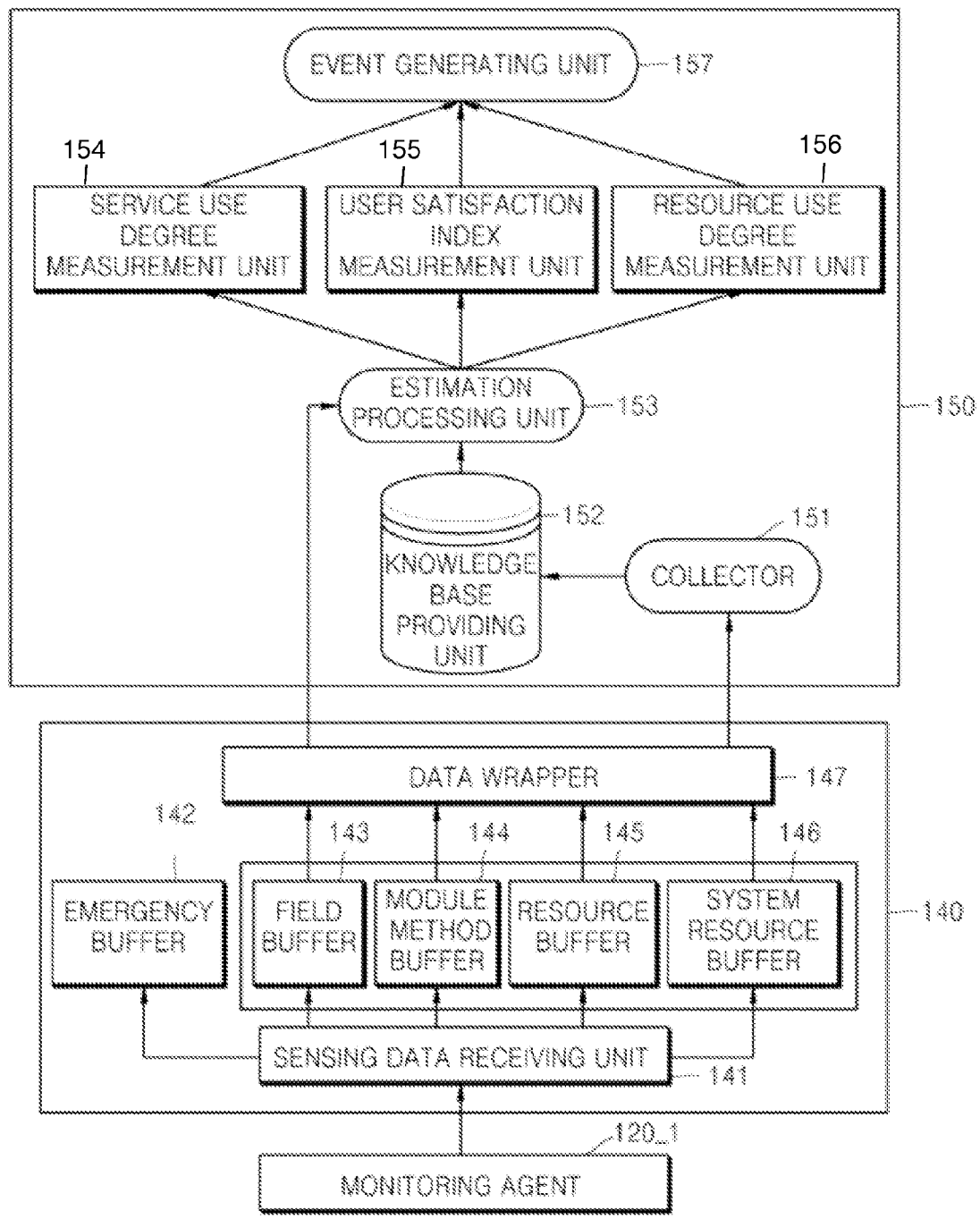
FIG. 2 is a block diagram illustrating a monitoring module and an analysis module shown in FIG. 1 in detail.

FIG. 2 is a block diagram illustrating the monitoring module 140 and the analysis module 150 in detail.

Referring to FIG. 2, the monitoring module 140 may include a sensing data receiving unit 141, an emergency buffer 142, a field buffer 143, a module method buffer 144, a resource buffer 145, a system resource buffer 146, and a data wrapper 147.

The sensing data receiving unit 141 receives sensing data from the monitoring agent 120_1. The emergency buffer 142 processes sensing data to be emergently monitored. The field buffer 143 monitors function and performance of a ubiquitous intelligent object, which is remote-executed. The module method buffer 144 monitors a status of executing a method in a ubiquitous intelligent object service module. The resource buffer 145 analyzes statuses of a CPU and a memory of the ubiquitous intelligent object service module in real time. The system resource buffer 146 analyzes a status of a resource of a host where the ubiquitous intelligent object service module is used, and a status of a resource of the system 100 where the ubiquitous intelligent object service module is included. The data wrapper 147 collects and transmits processing results of the emergency buffer 142, the field buffer 143, the module method buffer 144, the resource buffer 145, and the system resource buffer 146, to the analysis module 150.

Referring to FIG. 2, the analysis module 150 may include a collector 151, a knowledge base providing unit 152, an estimation processing unit 153, a service use degree measurement unit 154, a user satisfaction index measurement unit 155, a resource use degree measurement unit 156, and an event generating unit 157.

The collector 151 collects one of sensing data and processing results from the monitoring module 140. The knowledge base providing unit 152 stores the sensing data and the processing results from the collector 151. The estimation processing 153 transmits one of sensing data and processing results of the knowledge base providing unit 152 to the service use degree measurement unit 154, the user satisfaction index measurement unit 155, and the resource use degree measurement unit 156.

The service use degree measurement unit 154 measures a degree of use of a user with respect to a ubiquitous service formed of ubiquitous community. The user satisfaction index measurement unit 155 measures a degree of satisfaction of a user as an index, by reflecting variances of various indexes of a ubiquitous service. The resource use degree measurement unit 156 measures a degree of using resources according to providing a ubiquitous service. The service use degree measurement unit 154, the user satisfaction index measurement unit 155, and the resource use degree measurement unit 156 may operate based on the knowledge base providing unit 152. As described above, the analysis module 150 may deduce high-level monitoring factors by integrating and analyzing various monitoring information based on knowledge.

The event generating unit 157 generates events on measurement results of the service use degree measurement unit 154, the user satisfaction index measurement unit 155, and the resource use degree measurement unit 156.

Figure 3:
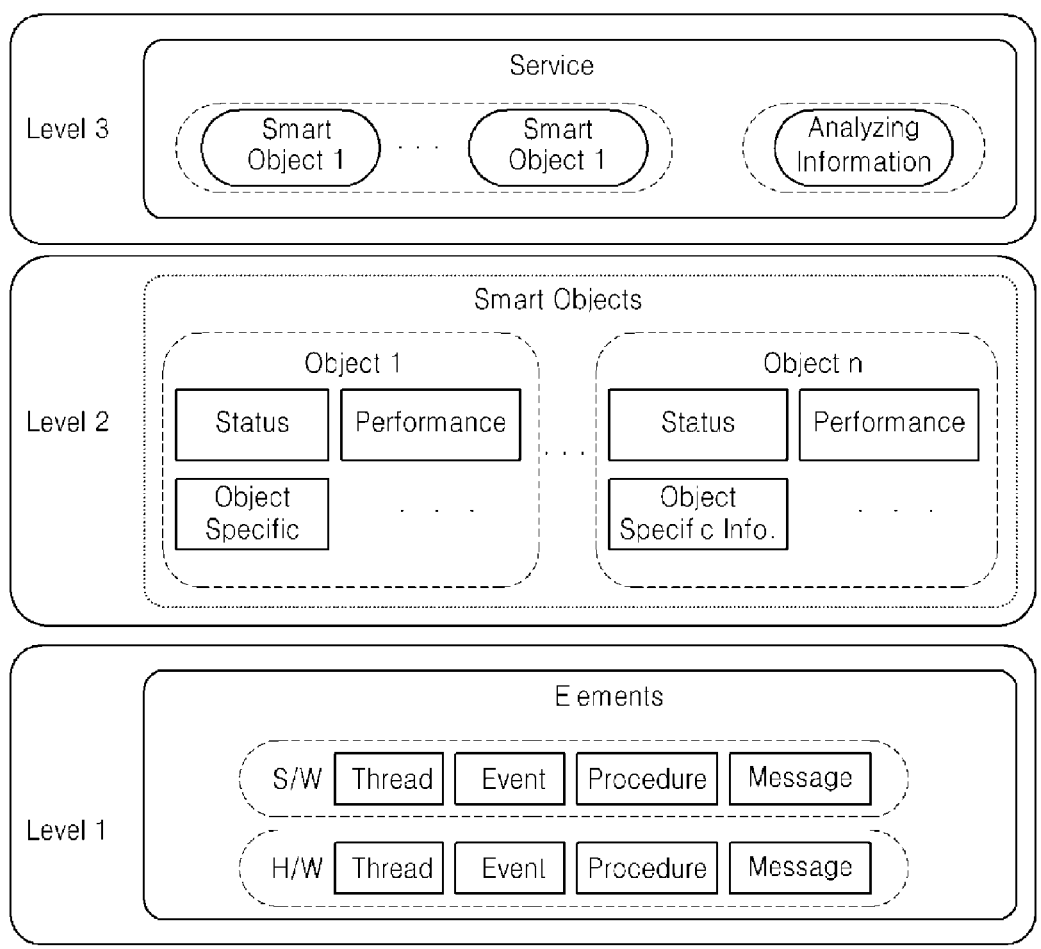
FIG. 3 is a diagram illustrating layered information of the ubiquitous monitoring system.

FIG. 3 is a diagram illustrating layered information of the system 100.

Referring to FIG. 3, first level information may be sensing data sensed by the sensing nodes APP_1 to APP_n, EQ1 to EQn, and SW1 to SWn. Second level information may be information on each of smart objects, which is generated by the analysis module 150, based on sensing data. Third level information may be information on a ubiquitous service, which is generated by the analysis module 150, based on information on each of smart objects. In this case, upper level information may be generated based on lower level information. For example, the third level information may be generated based on the second level information, and the second level information may be generated based on the first level information.

As described above, the system 100 may deduce and generate information on smart objects and information on a ubiquitous service, based on sensing data. Accordingly, statuses of various smart objects in a ubiquitous space may be monitored in real time, and a level of a ubiquitous service may be analyzed and estimated. Also, it is possible to integrally monitor various smart objects in a ubiquitous space. Also, it is possible to provide adaptable services to users in a dynamic environment by analyzing and applying sensing data from the monitoring module 140 and to provide an environment for self-restoration when there is generated interruption or malfunction in the system 100.

The analysis module 150 may determine whether to deduce both of the second level information and the third level information, to deduce only the second level information, or to deduce neither of the second level information and the third level information.

As described above, exemplary embodiments have been shown and described. Though specific terms are used herein, they are just used for describing the present invention but do not limit the meanings and the scope of the present invention disclosed in the claims. Therefore, it would be appreciated by those skilled in the art that changes may be made to these embodiments without departing from the principles and spirit of the invention. Accordingly, the technical scope of the present invention is defined by the claims and their equivalents.

INDUSTRIAL APPLICABILITY

The present invention may be applied to the field of ubiquitous monitoring systems capable of monitoring various objects in a ubiquitous space.

The invention claimed is:
1. A ubiquitous monitoring system comprising:
a plurality of sensing nodes;
one or more monitoring agents receiving and transmitting sensing data of the sensing nodes;
a monitoring module receiving the sensing data from the one or more monitoring agents and managing the sensing data for each type and time;
an analysis module deducing function information, performance information, or status information for each of smart objects in a ubiquitous space, based on the sensing data, and deducing function information, performance information, and status information of a ubiquitous service performed by coupled smart objects, or transmitting a result of deduction; and
a monitoring viewer displaying the result of deduction to a user,
wherein the analysis module comprises:
a collector collecting the sensing data or processing results from the monitoring module;
a knowledge base providing unit storing the sensing data and the processing results from the collector;
an estimation processing unit transmitting the sensing data and the processing results of the knowledge base providing unit to a service use degree measurement unit, a user satisfaction index measurement unit, or a resource use degree measurement unit;

the service use degree measurement unit measuring a degree of use of a user with respect to a ubiquitous service formed of ubiquitous community;

the user satisfaction index measurement unit measuring a satisfaction index of the user by reflecting variations of various indexes of the ubiquitous service;

the resource use degree measurement unit measuring a degree of using resources according to providing the ubiquitous service; and an event generating unit generating events on measurement results of the service use degree measurement unit, the user satisfaction index measurement unit, and the resource use degree measurement unit.

2. The system of claim 1, wherein the sensing data are layered as first level information, wherein information for each of the smart objects is layered as second level information, wherein information on the ubiquitous service is layered as third level information, and wherein the analysis module determines whether to deduce both of the second level information and the third level information, to deduce only the second level information, or to deduce neither of the second level information and the third level information.

3. The system of claim 1, wherein the sensing data comprise hardware data selected from a rate of using a CPU by hardware, status of using a memory, and a residual amount of a battery in the sensing nodes, or software data selected from thread information of software, message transmission status, and status of procedure in the sensing nodes.

4. The system of claim 1, further comprising a database storing the sensing data or a log of the result of deduction.

5. The system of claim 1, wherein the monitoring module comprises:

a sensing data receiving unit for receiving the sensing data from the monitoring agent;

an emergency buffer for processing sensing data to be emergently monitored, among the sensing data;

a field buffer for monitoring function and performance of a ubiquitous intelligent object, which is remote-executed;

a module method buffer for monitoring status of executing a method in a ubiquitous intelligent object service module;

a resource buffer for analyzing statuses of a CPU and a memory of the ubiquitous intelligent object service module, in real time;

a system resource buffer for analyzing status of a resource of a host where the ubiquitous intelligent object service module is used and status of a system where the ubiquitous intelligent object service module is included; and a data wrapper for collecting and transmitting processing results of the emergency buffer, the field buffer, the module method buffer, the resource buffer, and the system resource buffer, to the analysis module.

* * * * *